US008082399B2

(12) United States Patent  (10) Patent No.: US 8,082,399 B2
Pasch et al.  (45) Date of Patent: Dec. 20, 2011

(54) CACHE BOUNDED REFERENCE COUNTING

(75) Inventors: Eberhard Pasch, Tuebingen (DE);
Hans-Werner Tast, Weil im Schoenbuch (DE); Achim Haessler, Waldenbuch (DE); Markus Nosse, Leonberg (DE); Elmar Zipp, Schlaitdorf (DE)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 12/184,165

(22) Filed: Jul. 31, 2008

(65) Prior Publication Data

US 2010/0030968 A1  Feb. 4, 2010

(51) Int. Cl.
*G06F 13/376* (2006.01)
(52) U.S. Cl. ...................................................... 711/145
(58) Field of Classification Search .................. None
See application file for complete search history.

(56) References Cited

U.S. PATENT DOCUMENTS

| 6,434,576 | B1 | 8/2002 | Garthwaite |
| 6,839,726 | B2 | 1/2005 | Kawamoto |
| 7,774,546 | B1 * | 8/2010 | Wright et al. ................. 711/118 |
| 2005/0283771 | A1 | 12/2005 | Paller |
| 2007/0203960 | A1 | 8/2007 | Guo |

OTHER PUBLICATIONS

Choi, Jong-Deok, Manish Gupta, Mauricio Serrano, Vugranam C. Sreedhar and Sam Midkiff. "Escape Analysis for Java" 1999 ACM SIGPLAN Conference on Object-Oriented Programming Systems, Languages, and Applications (OOPSLA99). Denver, Colorado, Nov. 1, 1999.

Ho, C. Y., W. Y. Lo and Anthony S. S. Fong. "Memory Garbage Collection for an Object-Oriented Processor" Proceedings of the International Conference on Information Technology; pp. 522-527: 2007.

Meyer, Matthias. "An On-Chip Garbage Collection Coprocessor for Embedded Real-Time Systems" Proceedings of the 11th IEEE International Conference on Embedded and Real-Time Computing Systems and Applications; pp. 517-524: Aug. 2005.

Chilimbi, Trishul M. and James R. Larus. "Using Generational Garbage Collection to Implement Cache-Conscious Data Placement" Proceedings of the 1st International Symposium on Memory Management; pp. 37-48: 1998.

Paller, Gabor. "Increasing Java Performance in Memory-Constrained Environments Using Explicit Memory Deallocation" International Workshop on Mobility Aware Computing; 2005.

Nilsen, Kelvin D. "Cost-Effective Hardware-Assisted Real-Time Garbage Collection" ACM PLDI Workshop on Language, Compiler, and Tool Support for Real-Time Systems; Jun. 1994.

(Continued)

*Primary Examiner* — Duc Doan
(74) *Attorney, Agent, or Firm* — King & Spalding

(57) ABSTRACT

Cache bounded reference counting for computer languages having automated memory management in which, for example, a reference to an object "Z" initially stored in an object "O" is fetched and the cache hardware is queried whether the reference to the object "Z" is a valid reference, is in a cache, and has a continuity flag set to "on". If the object "Z" is a valid reference, is in the cache, and has a continuity flag set to "on", the object "O" is locked for an update, a reference counter is decremented for the object "Z" if the object "Z" resides in the cache, and a return code is set to zero to indicate that the object "Z" is de-referenced and that its storage memory can be released and re-used if the reference counter for the object "Z" reaches zero. Thereafter, the cache hardware is similarly queried regarding an object "N" that will become a new reference of object "O".

1 Claim, 2 Drawing Sheets

OTHER PUBLICATIONS

Burtscher, Martin, Amer Diwan and Matthias Hauswirth. "Static Load Classification for Improving the Value Predictability of Data-Cache Misses" ACM SIGPLAN Notices; vol. 37, Issue 5 (May 2002) Session: Dynamic Prefetching & Cache Optimizations; pp. 222-233; 2002.

Wright, Greg, Matthew L. Seidl and Mario Wolczko. "An Object-Aware Memory Architecture" Science of Computer Programming archive; vol. 62, Issue 2 (Oct. 2006); Special issue on five perspectives on modern memory management: Systems, hardware and theory; pp. 145-163; 2006.

* cited by examiner

CACHE BOUNDED REFERENCE COUNTING

BACKGROUND OF THE INVENTION

1. Field of the Invention

This invention relates to memory management and more particularly to methods of cache bounded reference counting.

2. Description of Background

A problem with the existing art is that all of the languages that have an automatic memory management, such as Java, C#, and Python, suffer from performance issues. That means much memory is allocated on top of the heap (i.e., of unused memory) normally, and the heap grows very rapidly. Regardless of whether objects that are allocated are used for a long period of time or for a very short period of time, all new objects are allocated on top of this heap, and the re-use of memory space occupied by objects that are no longer used occurs only after a garbage collection is run. Normally this growth of the heap by repeatedly piling new memory objects on top of the heap, means that memory areas are accessed/used that are not represented in the cache at this moment. This causes a cache miss to occur, which causes a long delay as a consequence.

Disadvantages of the standard way to allocate memory on top of the growing heap for such languages with automatic memory management is the quite significant number of cache misses for each new cache line that is accessed which is not stored in the cache and is new for the program. Thus, there is memory consumption because there is no re-use of memory that is no longer used until the garbage collection is run. This is a disadvantage of the existing art compared to languages of explicit memory management such as C or C++. For languages with automatic memory management, such as Java, it is necessary to run frequent garbage collections in order to compact the heap again and to regain memory areas for new allocation.

Efforts are currently on-going in the industry and research in universities to address those issues for languages such as Java. For example, efforts are currently on-going to modify Java byte code to recognize such re-use patterns upfront such as by adding free( ) instructions automatically into the byte code. Then a so-called escape analysis is performed that identifies objects which are bound to the scope of a specific method. Instead of allocating such objects on the heap, they are allocated on a stack frame of that particular method which is quite likely to be re-used more often and therefore more likely to reside in the cache. This also gives a relief to the heap which is not growing as fast as it otherwise might be, but this relief is not complete. This is available only for objects which are identifiable upfront and strictly related to a specific method (or functional procedure in which it is used) and cannot escape that method.

SUMMARY OF THE INVENTION

Embodiments include cache bounded reference counting for computer languages with automatic memory management.

Embodiments include cache bounded reference counting for computer languages having automated memory management involving, for example, fetching a reference to object "Z" initially referenced by an object "O" and querying cache hardware whether the object "Z" is a valid reference, is in a cache, and has a continuity flag set to "on". If the object "Z" is a valid reference, is in the cache, and has a continuity flag set to "on", the object "O" is locked for an update, a reference counter for the object "Z" is decremented if the object "Z" resides in the cache, and a return code is set to zero to indicate that the object "Z" is de-referenced and that its storage memory can be released and re-used if the reference counter for the object "Z" reaches zero.

Embodiments further propose that the cache hardware is queried whether an object "N" that will become a new reference of object "O" is a valid reference, is in the cache, and has a continuity flag set to "on". If the object "N" is a valid reference, is in the cache, and has a continuity flag set to "on", a reference counter for the object "N" is incremented and an address for the object "N" is stored into a pointer of the object "O". If the object "N" is not in the cache, an address for the object "N" is stored into a pointer of the object "O" without incrementing the reference counter for the object "N". The return code of zero is provided if the object "Z" is de-referenced.

TECHNICAL EFFECTS

As a result of the summarized invention, technically we have achieved a solution for implementing methods of cache bounded reference counting for computer languages having automated memory management involve fetching an object "Z" initially referenced by an object "O" and querying cache hardware whether the object "Z" is a valid reference, is in the cache, and has a continuity flag set to "on". If so, the object "O" is locked for an update, a reference counter for the object "Z" is decremented if the object "Z" resides in the cache, and a return code is set to zero to indicate that the object "Z" is de-referenced and that its storage memory can be released and re-used if the reference counter for the object "Z" reaches zero. If not, the cache hardware is queried whether an object "N" that will become a new reference of object "O" is a valid reference, is in the cache, and has a continuity flag set to "on". If so, a reference counter for the object "N" is incremented and an address for the object "N" is stored into a pointer of the object "O". If the object "N" is not in the cache, an address for the object "N" is stored into a pointer of the object "O" without incrementing the reference counter for the object "N". The return code of zero is provided if the object "Z" is de-referenced.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
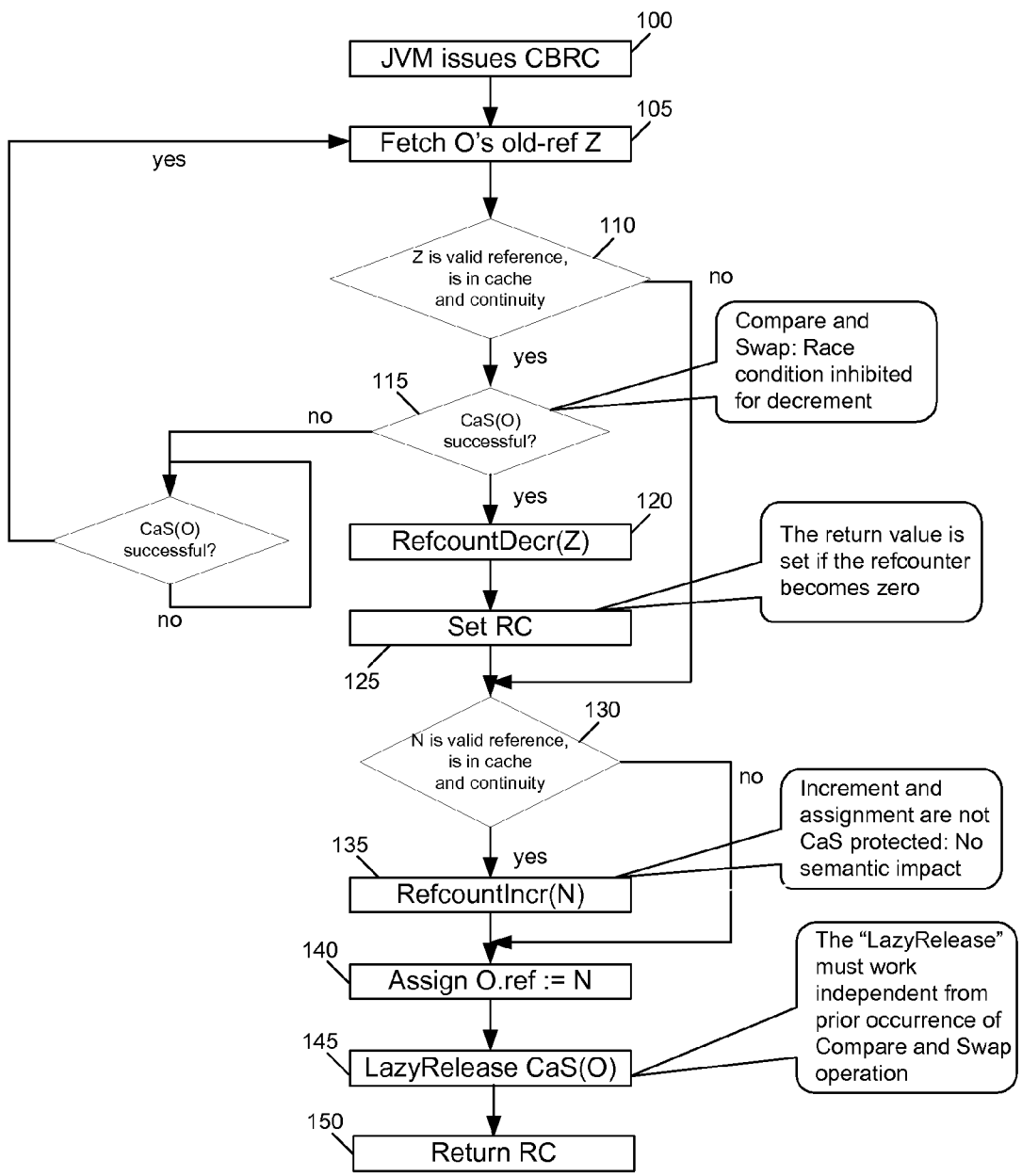
FIG. 1 is a flow chart that illustrates an example of the sequence of cache bounded reference counting operations for embodiments of the invention.

The detailed description explains the preferred embodiments of the invention, together with advantages and features, by way of example with reference to the drawings.

DETAILED DESCRIPTION OF THE INVENTION

Computer languages with automatic memory management, such as Java, C#, Python and other languages with similar concepts, suffer from memory-related performance issues. Focusing on Java, when allocating new objects, memory outside of the cache is accessed (growing heap), there is no reuse of unused memory before a garbage collection is run, and there is a performance impact of several orders of magnitude if cache miss is encountered. There is high memory consumption in order to reach comparable performance levels of languages with explicit memory management (e.g., C/C++), and frequent garbage collections are required to compact the exhausted memory heap.

Embodiments of the invention enable automatic use of explicit memory management by the runtime environments of languages like Java that have an automated memory management. Java code is an executed program code that does not have any explicit free( ) calls that would release unused memory objects without the means of garbage collection. Embodiments of the invention provide a way to identify in the Java runtime environment at which point in time the memory object is unused and could be reallocated and reused for another allocation request. Embodiments of the invention provide significant improvements over various existing approaches. For example, for runtime operation, no upfront modification of user code is necessary. Embodiments of the invention propose use of a runtime operation that does not need any modification of user code and does not require additional cache or changed cache logic and philosophy. Instead, standard cache is exploited by adding new hardware hints.

Nor do embodiments of the invention require replacement of existing garbage collection or implementation of sophisticated ways to perform storage management. No replacement of existing garbage collection is needed. Established advantages are still used. Local variables can be reference counted due to low performance overhead. No buffering of refcount updates is needed, there is no cache pollution, and the methods for embodiments of the invention are race-free. Instead, embodiments of the invention propose a new assist function that allows optimization of the memory management in a stable and high performance way, at the same time addressing most of the other issues present in the existing art. The general design for embodiments of the invention optimizes the assist function without a need to be functionally complete and provides inherent stability against precision loss.

A goal of embodiments of the invention is identification of unused memory elements within the cache that can immediately be reused for new allocations within the cache. Embodiments of the invention utilize cache hardware to help in the identification of unused memory elements that can be re-used for new allocations within the cache. Thus, the cache hardware provides information that the software is able to use in order to decide how to allocate new objects in the memory and especially in cached memory. This provides an advantage in that there is no cache miss for the new allocation and memory is used that is already reflected and back in the cache (fitting a hole in the cache, so to speak), optimizing the cache usage and the cache density and having the particular data element available immediately without any cache miss waiting time or the like.

In order to identify such elements, embodiments of the invention employ so-called cache bounded reference counting. Reference counter updates need to be bound to the cache. Reference counting means that each object that exists has a counter that indicates how many references exist to the particular object. If that number drops to zero, that means that the object is not referenced any more by any pointer and any other variable and that nobody is able to use that object any more because there is no link any more to that object. This means that the object can be released and freed and its storage memory can be re-used for other purposes.

A typical problem with reference counting is that it is a very expensive operation that needs to make many updates of reference counters in the memory for all the objects it needs to track. According to embodiments of the invention, reference updates are only within the cache and inconsistencies are avoided by means of a new function of the cache hardware that assures that only consistent reference counter updates are executed. Inconsistencies occur, for example, due to something dropping out from the cache and being reloaded again because, for example, of a likelihood of a missed reference counter update in the meantime. Embodiments of the invention also ensure that decrement races between different runtime-threads are avoided.

Cache bounded reference counting for embodiments of the invention is a distributed function of software (or firmware) and hardware which is used by the language runtime (e.g., Java VM, C# . . . ). Embodiments of the invention involve a distributed function between software or firmware (i.e., internal software which is not visible to the user) and the hardware. This function for embodiments of the invention is used by the language runtime, for example, for Java, C#, or Python, or any other language with automated memory management.

Embodiments of the invention utilize, for example, two items of information that are provided by the cache hardware to the software. The two items of information are that something "is in cache" which means that an object is represented in the cache and that it also has "never left the cache" since it has been generated there and created there. The information "is in cache" and "never left the cache" is sufficient for the language runtime to identify unused cache positions. During reference counting, a query to the cache guarantees that only cached objects are updated. During reference counting, the cache is queried whether an object is "in the cache" and has "never left the cache", and that means that only in-cache objects are updated and that no reference counter update got lost. These updates are fast and can be done synchronously because the cache, and especially the level one cache, is as fast as the processor itself. It has the same clocking speed and is a high performance operation just as a register accesses the processor.

Embodiments of the invention introduce a continuity-flag which is stored in the cache control structures. It indicates that a cache line has been continuously available in the cache since the flag has been set when the heap is extended. The continuity-flag is one bit for each cache line that indicates that a cache line has been continuously available in the cache since the flag has been set. Thus, when an object is allocated and a new cache line is accessed and created for that new object, at that moment, the continuity-flag is set to one for the particular cache line, which means that the object is "in the cache" and it has "never left the cache". For all the accesses to that object in which this continuity-flag is still set to one, it is guaranteed that the object has always been available in the cache, that the reference counter of that object is current and up-to-date, and that all the updates have been integrated into that reference counter number.

FIG. 1 is a flow chart that illustrates an example of the operation sequence of cache bounded reference counting for embodiments of the invention. The operation sequence as shown in FIG. 1 indicates with a return value=0 that a de-referenced object is void and can immediately be reused while still residing in the cache. In other words, the cache bounded reference counting operation for embodiments of the invention can end with a value of zero, which means that there is no longer any reference to a specific object, that the particular object is now de-referenced, and that it can immediately be re-used while the object still resides in the cache.

The reference counting continues as long as the counter is not zero, and if the counter is zero, the object can immediately be reclaimed.

Referring further to FIG. 1, at 100, the Java Virtual Machine (JVM) issues an instruction for the cache bounded reference counting operation in order to update a reference in the memory. This can be regarded as a pointer or the like that points to a specific object. The object that contains the reference is referred to as "O", which could be an object with a specific field that points to another object, or it could be a local variable as, for example, Java has local variables on its runtime spec. The object referred to as "Z" is the object that was initially referenced by "O", but its reference is now to be overwritten. The object referred to as "N" will be the new reference of "O" replacing the old reference to "Z". This means that the reference to "Z" will be overwritten with a reference to "N" as the new object referenced by "O". The pointer has an old value which will be discounted, and a new value will be swapped.

Referring again to FIG. 1, at 105, the first operation is that the old reference "Z" is fetched. Then at 110 there is a query whether this is a valid reference in the cache and the continuity-flag is "on". This is information that will be provided by the cache hardware, and if the answer is "yes", at 115, the object "O" is locked for a critical update. This is something like a compare and swap operation to inhibit race conditions here in the decrement operation. At 120, the reference counter will be decremented for the object "Z", but only if "Z" resides in the cache. If the reference counter of "Z" reaches zero, at 125, the return code or instruction will be set to zero to indicate that the object "Z" is now de-referenced and can be re-used.

The same query for the cache hardware for the new object "N" is performed at 130, i.e., whether "N" is a valid reference, is in cache, and the continuity-flag is on. If the valid reference is in cache and the continuity-flag is on, at 135, the reference counter for the new object "N" is increased, and at 140, the assignment of the reference is done. This means that the address of the new object "N" is stored into the pointer which was the original goal of the JVM when it issued the cache bounded reference counting operation instruction. If one or both of the objects "Z" and "N" are no more available in the cache, then no reference counter update is done and only the overwriting of the original reference is done, as demanded by the executed software program. At the end of the operation, at 145, is the so-called "lazy release" of the compare and swap lock. That means that regardless of whether the other lock has been gained or not, this lock is now released and, at 150, the return code is given back to the caller. The return code is now one or zero. If it is zero, that means that the old object "Z" is now de-referenced and its storage memory can be released and re-used. Only if the object "Z" or "N" is in the cache are the reference counter updates made within that object. These are very fast operations if those objects reside in the level one cache, because the operation takes place at processor speed without any wait time or delay to wait for memory. This is a main difference from any other reference counting method that touches many of the memory locations outside of the cache. If the object is not in the cache, the cache repels the reference counter update efficiently with processor-cyclespeed.

Figure 2:
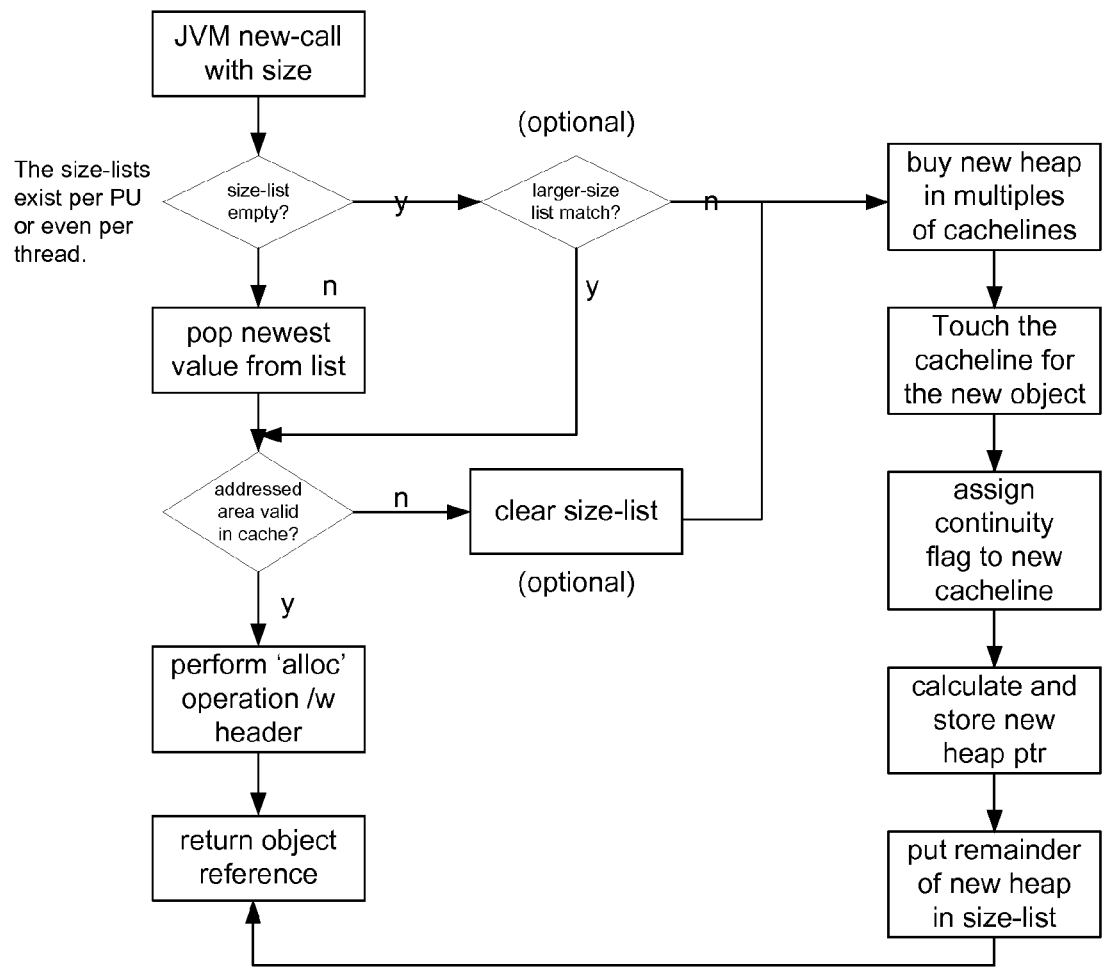
FIG. 2 is a flow chart that illustrates an example of the allocation operation for embodiments of the invention.

Another aspect of embodiments of the invention is an operation that sets the continuity-flag during the allocation of a new object on the heap. FIG. 2 is a flow chart that illustrates an example of the allocation operation for embodiments of the invention.

Reference counting according to embodiments of the invention does not change any semantics of the program and the data that is managed by the program. The software does not depend on the status of the cache. Even if precision of the cache management is lost, embodiments of the invention are stable against such a loss of precision because the software would not see any difference.

Generally, superfluous reference counter decrements need to be avoided since this could lead to a de-referencing of an object that is still accessible. Hence, reference counter decrements may get lost without causing damage but must not be multiplied without affecting the program execution.

In the worst case, it may appear that an object is still reachable in the cache and that its reference count would not go to zero but in fact a new cache line needs to be loaded for it, which is normal cache operation. The object still stays in the memory and will be reclaimed by the normal garbage collection later. If a superfluous increment should be executed without compare-and-swap protection, e.g., due to a multi-thread race condition, this is semantically harmless, since only the efficiency gain of reclaiming an unused object is lost. The only effect is that one increment too many is added to a reference count which is harmless and simply means that the particular object will not be reclaimed before the normal garbage collection. The next garbage collection will clean up all objects that are not accessible regardless of the refcounter values.

The following are examples of interfaces and operations to be implemented between software (or firmware) and hardware to implement cache bounded reference counting for embodiments of the invention.

1. SW→HW: Check cache availability for a memory address: [address→flag]
2. SW→HW: Query continuity-flag for cache line: [address→flag]
   (Note: this can be merged into #1 if a multi-value return code is used)
3. SW→HW: Set continuity-flag for a cache line to 'on': [address]
4. HW→HW: Guarantee that a new or loaded cache line has an 'off' continuity-flag First, embodiments of the invention involve checking the availability of a memory element in the cache for a different address. This operation needs to return a flag "Yes" or "No" to indicate whether or not it is available in the cache. Second, embodiments of the invention involve querying the continuity-flag for a cache line. This can eventually be merged with the first operation by returning a multi-value return code. Third, embodiments of the invention involve setting the continuity-flag to "on" for a specific address. This is done the moment when a new object is allocated on top of the heap. Since the flag is valid for a whole cacheline, the object allocation occurs in multiples of cachelines. Remainders are put into the appropriate free-lists for the allocated object size. For the fourth interface, internally in the hardware there is a function that guarantees that every new or loaded cache line has a continuity-flag set to "off". This means that each cache line that is loaded and installed in the cache needs to have that flag set to "off" (i.e., needs to have the initial value zero). In this way, the continuity-flag is always consistently handled in the cache.

The flow diagrams depicted herein are only examples. There may be many variations to these diagrams or the steps (or operations) described therein without departing from the spirit of the invention. For example, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method of cache bounded reference counting for computer languages having automated memory management, comprising:

fetching a reference to an object "Z" initially stored in an object "O";

querying cache hardware whether the reference to the object "Z" is a valid reference, is in a cache, and has a continuity flag set to "on";

if the object "Z" is a valid reference, is in the cache, and has a continuity flag set to "on", locking the object "O" for an update, decrementing a reference counter for the object "Z" if the object "Z" resides in the cache, and setting a return code to zero to indicate that the object "Z" is de-referenced and that its storage memory can be released and re-used if the reference counter for the object "Z" reaches zero;

after handling the object "Z", querying the cache hardware whether an object "N" that will become a new reference of object "O" is a valid reference, is in the cache, and has a continuity flag set to "on";

if the object "N" is a valid reference, is in the cache, and has a continuity flag set to "on", incrementing a reference counter for the object "N" and storing an address for the object "N" into a pointer of the object "O";

if the object "N" is not in the cache, storing an address for the object "N" into a pointer of the object "O" without incrementing the reference counter for the object "N"; and providing a pre-defined return code if the object "Z" is de-referenced and allowing re-use of the storage memory of the de-referenced object while the de-referenced object is still in the cache.

* * * * *